United States Patent

Strauss

[15] 3,681,672
[45] Aug. 1, 1972

[54] CAPACITOR OVERCHARGE PROTECTION CIRCUIT

[72] Inventor: Karl-Peter Strauss, Braunschweig, Germany

[73] Assignee: Rollei-Werke Franke & Heidecke, Braunschweig, Germany

[22] Filed: July 1, 1971

[21] Appl. No.: 158,957

[52] U.S. Cl..................320/1, 307/110, 323/22 R
[51] Int. Cl..........................H03k 1/02, G05f 1/46
[58] Field of Search.........320/1; 307/110; 317/12 A; 323/22 R

[56] References Cited

UNITED STATES PATENTS

| | | | |
|---|---|---|---|
| 3,417,306 | 12/1968 | Knak | 320/1 |
| 3,526,821 | 9/1970 | Thomas | 320/1 |
| 3,634,671 | 1/1972 | Swarbrick | 320/1 X |

Primary Examiner—Bernard Konick
Assistant Examiner—Stuart Hecker
Attorney—Charles Shepard et al.

[57] ABSTRACT

Photo flash apparatus having two storage capacitors connected in series. Normally both capacitors are charged by a voltage doubling circuit connected to an alternating current supply, to a predetermined direct current voltage across both capacitors in series. To prevent overcharging and possible breakdwon of one capacitor in case the charge on the other capacitor decreases as a result of leakage current, the invention provides a safety circuit having two resistors in series with each other and in parallel with the respective capacitors, the safety circuit having a central connection from the junction between the two resistors to the junction between the two capacitors, the central connection containing an impulse transformer which operates when the charges on the two capacitors differ by more than a predetermined amount. The output of the impulse transformer can be used to give an indication of fault or to interrupt automatically the charging of the capacitors.

9 Claims, 3 Drawing Figures

3,681,672

CAPACITOR OVERCHARGE PROTECTION CIRCUIT

BACKGROUND OF THE INVENTION

The invention relates to electronic flash apparatus for photographic purposes, and particularly to apparatus of the known type in which the flash is powered from two capacitors arranged in series and normally charged from an alternating current source by means of voltage doubling circuits of the Greinacher type. It is advantageous to use capacitors connected in series, because the dielectric strength of the customary electrolytic capacitors is limited, and the connection of two such capacitors in series enables a higher working voltage to be obtained. It is thus possible, by the use of voltage doubling circuits of the Greinacher type, to produce a total direct current voltage, across the two capacitors in series, amounting to 5.65 times the effective alternating current voltage of the supply mains or circuits, with direct operation of the flash apparatus from the usual alternating current supply mains, without recourse to transformers.

The apparatus is usually equipped with disconnection means which interrupts the charging of the capacitors when the desired total direct current voltage is reached. However, if the charging voltage of one capacitor decreases (e.g., as a result of leakage current) then that of the other capacitor increases correspondingly, since the cumulative or total voltage across both capacitors remains the same. The increase in voltage on one capacitor may exceed the dielectric strength of that capacitor, so that it likewise fails.

An object of the invention is to provide a circuit which takes into account the lack of symmetry of the charges on the two capacitors and which, whenever the difference in voltage across the two capacitors exceeds a predetermined amount, will generate an impulse which will give a warning signal or indication to the user of the apparatus, or which will preferably shut off the charging current to one or both of the capacitors.

Another object of the invention is the provision of a circuit of the kind just mentioned, which is comparatively simple, relatively inexpensive, relatively easy to construct, and sturdy and reliable in use.

According to the invention, two resistors are arranged in series with each other and in parallel to the respective capacitors. The central connections or junctions of the capacitors and of the resistors are connected by a capacitor and an impulse transformer diac series circuit. When an unsymmetrical condition occurs, a voltage is produced in the central branch which includes the impulse transormer, the polarity of the voltage indicating which of the two capacitors has the lower and which has the higher partial voltage. If the voltage difference reaches a certain predetermined limit, then the diac ignites or fires, and the central branch capacitor discharges via the impulse transformer. The output of the impulse transformer can be used to light a lamp to give an optical or visual signal or indication of the fault, or the output can be used for automatic temporary interruption of the charging of the capacitors.

DESCRIPTION OF THE PREFERRED EMBODIMENT

Figure 1:
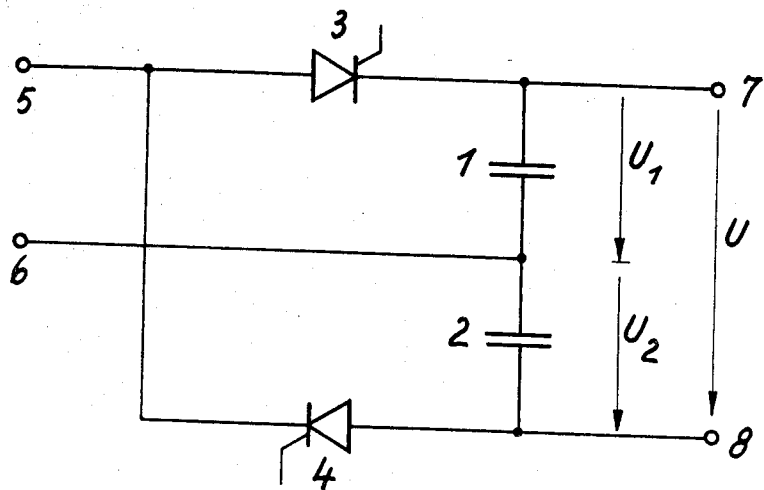
FIG. 1 is a wiring diagram illustrating the charging circuits of the storage capacitors, with trigger controlled rectifier elements.

Referring first to FIG. 1, there is shown a circuit for charging the main storage capacitors 1 and 2, connected in series with each other, through trigger control rectifiers 3 and 4, directly from alternating current mains connected to the input terminals 5 and 6 by means of any conventional plug adapted to be plugged into a conventional alternating current outlet. In a manner which will be understood by those skilled in the art, the capacitor 1 is charged to the voltage $U_1$, and the capacitor 2 is charged to the voltage $U_2$, so that the total or cumulative direct voltage U (equal to the sum of $U_1$ and $U_2$) is available across the terminals 7 and 8 and can be used for flashing a photo flash tube.

Figure 2:
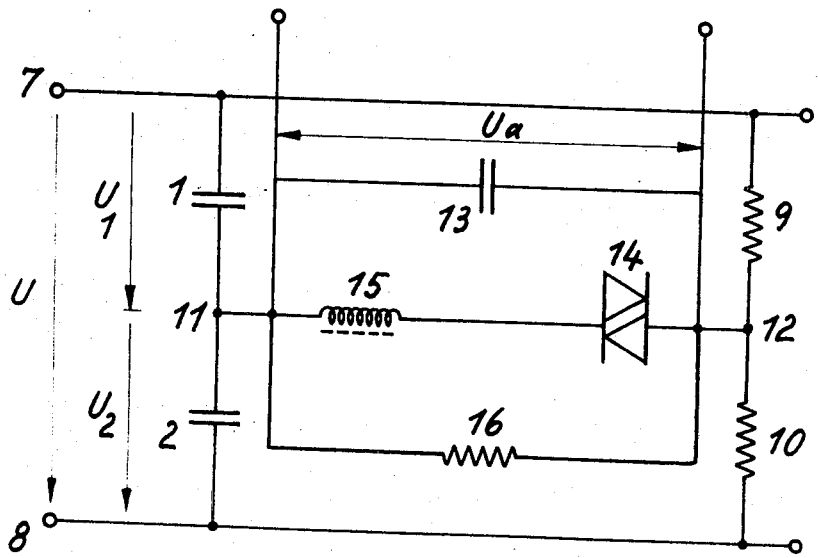
FIG. 2 is a wiring diagram showing one embodiment of the safety circuit which operates as a result of unsymmetrical charging of the two series capacitors.

In FIG. 2, there is shown the supplementary or safety circuit according to one embodiment of the present invention. The capacitors 1 and 2 are charged as before, through the charging circuit shown in FIG. 1. Two resistors 9 and 10 are arranged as shown, in series with each other and in parallel with the main storage capacitors 1 and 2. This safety circuit includes not only the resistors 9 and 10, but also what may be called a central circuit or a bridge circuit, connecting the junction or central point 11 between the two capacitors 1 and 2 to the junction or central point 12 between the two resistors 9 and 10. The two capacitors 1 and 2 are normally of the same capacity and are intended to be charged to the same voltage, so that $u_1 = U_2$. In these circumstances, the resistors 9 and 10 likewise have the same resistance values. However, if unsymmetrical distribution of the voltage in the capacitors 1 and 2 is intended, then the resistors 9 and 10 have different values in the same ratio as the respective capacities of the capacitors 1 and 2.

The above mentioned bridge circuit or central circuit connecting the junctions 11 and 12 has a capacitor 13, a diac 14, and the primary winding 15 of an impulse transformer. As illustrated in FIG. 2, the diac and the transformer are in series with each other, and in parallel with the capacitor 13. There may also be, if desired, a resistor 16 as further mentioned below, arranged in parallel with the capacitor 13 and in parallel with the diac and transformer combination.

If the voltage of the capacitors 1 and 2 is equal, i.e. if $U_1 = U_2$ then the central points or junction points 11 and 12 are at the same potential, and there will be no flow of current or difference in potential across the bridge circuit. However, if the voltage in one capacitor (say the capacitor 1) decreases, due to leakage currents or other fault, then the other voltage in the capacitor 2 will increase, since the sum of $U_1 + U_2$ remains constant. In this case, a potential difference or voltage occurs between the points 11 and 12, so that the capacitor 13 is charged up to this voltage. When this voltage exceeds the ignition voltage or firing voltage of the diac 14, the capacitor 13 discharges through the winding 15 of the impulse transformer. The circuit responds when the difference between the separate voltages is half as great as the ignition voltage of the diac 14. The response threshold can be increased if a resistor 16 is connected in parallel with the capacitor 13, as mentioned above. If a lower response threshold is desired, this resistor 16 may be omitted.

If $U_1$ and $U_2$ are the voltages of the charges on the capacitors 1 and 2, and $R_1$ and $R_2$ are the values of the resistors 9 and 10, respectively, and $R_3$ is the value of the resistor 16, then the voltage will be as follows:

$$U_a = \frac{U_1 - U_2}{2} \times \frac{R_3}{R_3 + \frac{1}{2}R_1}$$

In place of the diac 14, another element with bipolar "break-through," such as a glow lamp, can be employed. If a bridge rectifier is connected up in series, it is also possible to use an element with a unipolar "break-through," such as a four-layer diode, or a unijunction transistor, or the like. The system will respond if equilibrium is destroyed by short circuit or other damage to one of the resistors 9 and 10, as well as to lack of equilibrium in the main storage capacitors.

Figure 3:
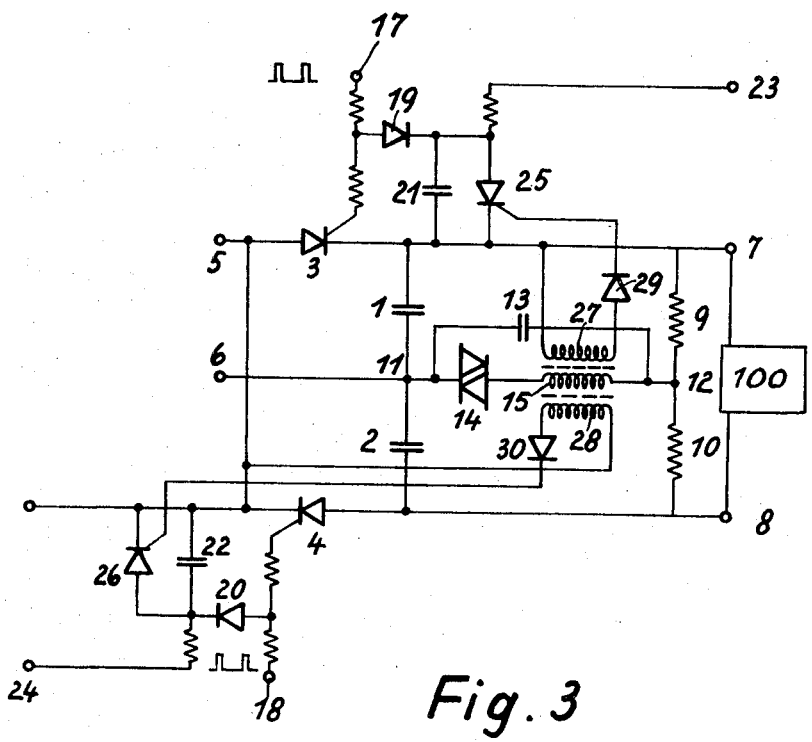
FIG. 3 is a wiring diagram of a complete circuit including provision for interrupting the charging of the storage capacitors when there is a predetermined difference in the charges on the two capacitors.

Referring now to FIG. 3, there is shown an embodiment of the invention in which the impulse generated in the transformer is used for selectively shutting off the particular capacitor which is endangered. Those parts which correspond to parts already described in connection with FIGS. 1 and 2 have been given the same reference numerals, and require no special further description.

The trigger impulses for the rectifier thyristors 3 and 4 are introduced from the terminals 17 and 18, respectively. Capacitors 21 and 22 are charged with an auxiliary voltage through the terminals 23 and 24, and are respectively connected to the trigger feed lines via the diodes 19 and 20, respectively. Parallel with the capacitors 21 and 22 are the thyristors 25 and 26, respectively, which can be selectively cut through by the ignition impulses from the secondary windings 27 and 28, respectively, of the impulse transformer 15, via the diodes 29 and 30, respectively.

Normally the capacitors 1 and 2 are charged up to the same voltage, and capacitors 21 and 22 are charged with an auxiliary voltage taking the opposite direction. The connection of the secondary windings 27 and 28 of the impulse transformer 15 in opposite direction insures in conjunction with the diodes 29 and 30 that the impulse generated when the diac 14 becomes conductive will be conveyed either to the thyristor 25 or to the thyristor 26, as the case may be.

During the charging of the main capacitors 1 and 2, if the voltage of the capacitor 1 lags behind that of the capacitor 2 to a sufficient extent that the diac 14 fires and an impulse is set up in the transformer winding 15, then the thyristor 26 is ignited. The associated capacitor 22 is thus discharged. By this process the trigger impulses are once again short circuited via the diode 20 and the discharged capacitor 22, until the capacitor 22 has once again been charged up. As long as this recharging proceeds, the continued charging of the storage capacitor 2 is interrupted. It is also possible for the interruption of the charging to be effected for both storage capacitors at the same time, if desired.

This control system is also applicable to cascade circuits of 4, 6, or more storage capacitors, by building up a number of bridge circuits in accordance with the teaching of FIG. 2. In this case, each storage capacitor can be selectively shut off by using circuits in accordance with FIG. 3. It is also possible for the entire cascade system to be shut off permanently or temporarily in the event of faults in one of the storage capacitors or one of the associated resistors.

Assuming that the charging of the storage capacitors proceeds normally, so that no operation of the safety system or protection system of the present invention is required, the final cumulative voltage of the storage capacitors is available across the terminals 7 and 8, and is used at the desired time to fire the photo flash tube, for taking the desired picture. The photo flash tube itself, and the control mechanism for firing it and for quenching the flash, if desired, may be in accordance with any conventional construction well known in the art, and so these parts are not illustrated here in detail but are indicated only schematically at 100. The details of the flash tube and its control mechanism are not important for purposes of the present invention and are subject to wide variation within the skill of the art, without affecting the present invention which deals with the charging of the storage capacitors to provide the power necessary for the flash tube, rather than dealing with the subsequent discharge or use of the stored power in producing the flash.

What is claimed is:

1. Electronic flash apparatus comprising two storage capacitors connected in series with each other to store a charge to provide power for a flash, two resistors connected in series with each other and in parallel with the two storage capacitors in such manner as to be subjected to the working voltage of the capacitors, and a bridge connection connecting a central junction between the two capacitors to a central junction between the two resistors, said bridge connection having a capacitor, an impulse transformer in parallel with such capacitor, and a break-through device becoming conductive when subjected to a predetermined difference in potential arranged in series with said transformer and in parallel with said last named capacitor, said apparatus being so arranged that when the voltage across one of said storage capacitors differs by more than a predetermined amount from the voltage across the other of said storage capacitors, said break-through device will become conductive and the bridge connection capacitor will discharge therethrough and through said transformer to activate said transformer.

2. Flash apparatus as defined in claim 1, wherein the resistance ratios of said two resistors correspond respectively to the desired charging voltage ratios of the two storage capacitors.

3. Flash apparatus as defined in claim 1, wherein said break-through device is a diac.

4. Flash apparatus as defined in claim 1, wherein said break-through device is a glow lamp.

5. Flash apparatus as defined in claim 1, wherein said break-through device is a four-layer diode.

6. Flash apparatus as defined in claim 1, wherein said break-through device is a unijunction transistor.

7. Flash apparatus as defined in claim 1, further including means responsive to activation of said transformer for at least temporarily blocking further charging of at least one of said storage capacitors.

8. Flash apparatus as defined in claim 1, further including means responsive to activation of said transformer for at least temporarily blocking further charging of that one of said storage capacitors which is charged to the higher voltage.

9. Flash apparatus as defined in claim 1, wherein said impulse transformer has a primary winding in series with said break-through device and two secondary windings (27, 28), said two storage capacitors (1, 2) have charging circuits separately controlled by two trigger-controlled rectifier thyristors (3, 4), and each of said secondary windings (27, 28) is operatively connected through a respective individual diode (29, 30) to a trigger circuit for the respective rectifier thyristor (3, 4) in such manner that passage of trigger impulses to the corresponding thyristor (3, 4) is blocked or short circuited.

* * * * *

UNITED STATES PATENT OFFICE
CERTIFICATE OF CORRECTION

Patent No. 3,681,672　　　　　　　　Dated August 1, 1972

Inventor(s) Karl-Peter Strauss

It is certified that error appears in the above-identified patent and that said Letters Patent are hereby corrected as shown below:

On the cover sheet insert:

[32]　Priority　July 2, 1970

[33]　　　　　　Germany

[31]　　　　　　P 20 32 731.5

Signed and sealed this 19th day of December 1972.

(SEAL)
Attest:

EDWARD M. FLETCHER, JR.　　　　　　ROBERT GOTTSCHALK
Attesting Officer　　　　　　　　　Commissioner of Patents